Inventor
Rudolph H. Blank.
By Lacey & Lacey,
Attorneys

Patented Oct. 31, 1939

2,178,013

UNITED STATES PATENT OFFICE 2,178,013

CORN PICKING ROLLER

Rudolph H. Blank, Walcott, Iowa

Application February 4, 1938, Serial No. 188,755

1 Claim. (Cl. 130—5)

This invention relates to corn picking rollers constituting elements of a corn harvesting machine, and it is one object of the invention to provide a pair of companion corn picking rollers adapted to be mounted in a corn harvesting machine of a conventional construction and serve to snap and husk ears of corn from corn stalks between the rollers during use of the corn harvester.

Another object of the invention is to provide a pair of corn picking rollers, one of which is formed with a pair of ribs for snapping and husking ears of corn from the corn stalks and the other with a larger number of spirally extending ribs serving to grip the corn stalks and assure proper movement of the stalks between the rollers longitudinally thereof.

It is another object of the invention to provide a pair of rollers having feeding ribs and snapping and husking ribs and in addition provided at their upper or rear ends with reversed ribs which serve to prevent the corn stalks from becoming jammed between upper or rear ends of the rollers and also assure removal of ears from the corn stalks.

Another object of the invention is to provide a snapping roller having in addition to the metal ribs which are formed integral with the roller, a plurality of rubber ribs extending longitudinally of the roller between rear or upper end portions of the metal ribs and serving very effectively to assure proper snapping of the ears from the corn stalks.

The invention is also based on pitch of spiral, speed of rollers, and travel of miles per hour of a husking machine or corn harvester.

Figure 1:
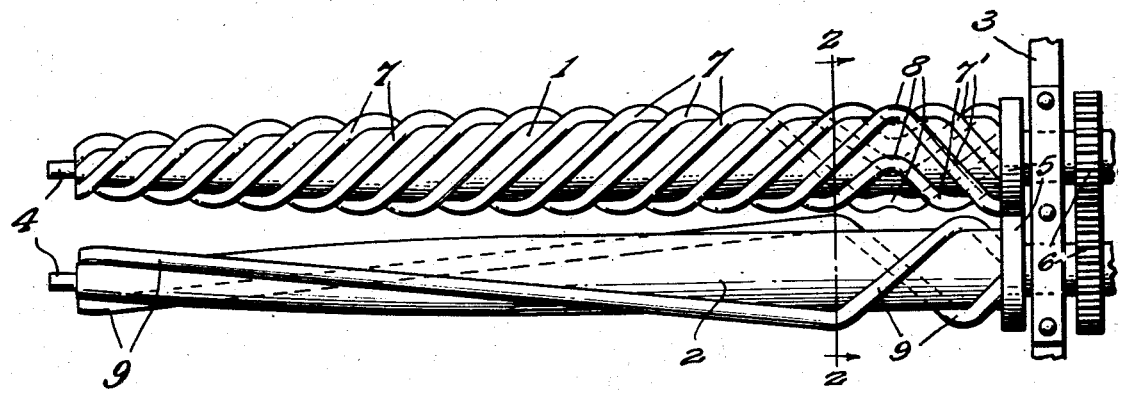
Figures 2, 3:
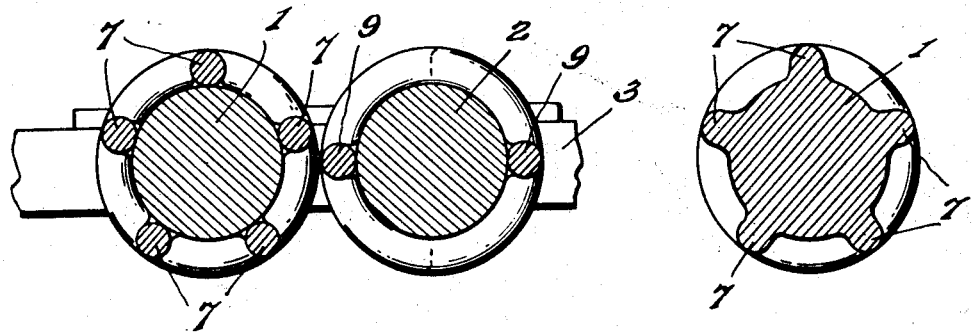
Figure 4:
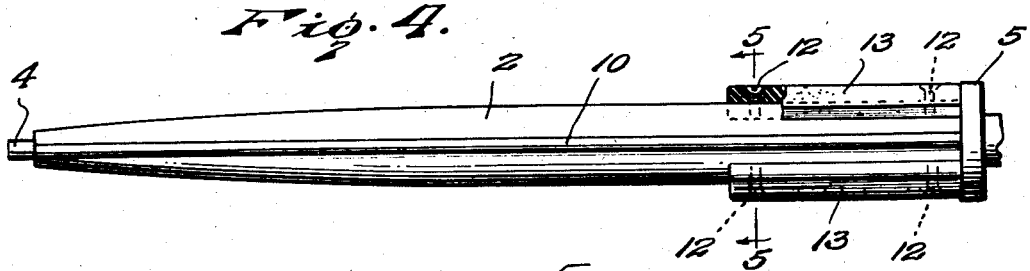
Figure 5:
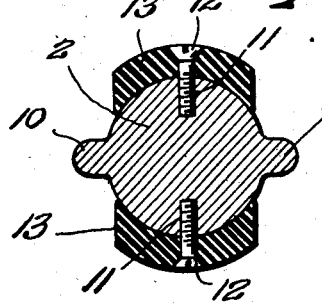

The invention is illustrated in the accompanying drawing, wherein:

Figure 1 is a view in elevation of a pair of rollers formed in accordance with this invention, Figure 2 is a sectional view taken transversely through the rollers along the line 2—2 of Figure 1, Figure 3 is a sectional view taken through a roller of a modified construction, Figure 4 is a side elevation of a modified form of snapping roller, and Figure 5 is a sectional view taken transversely through Figure 4 along the line 5—5.

The two rollers I and 2 constitute the pair of companion rollers, and these rollers are mounted in a corn harvester in the usual position so that, when a corn harvester is in use and drawn across a field, corn stalks may pass between the two rollers and the feeding roller I and snapping roller 2 cooperate with each other to remove ears of corn from the corn stalks.

Upper end portions of the rollers are rotatably mounted in bearings formed in a bar 3 and at their lower ends the rollers carry pivot pins or stems 4 or inner bearings for rotatably mounting the rollers.

Collars 5 which engage each other are formed adjacent upper ends of the rollers in advance of the bar 3, and back of this bar 3 the rollers carry gears 6 which intermesh each other in order that rotary motion may be transmitted from one roller to the other.

The axes of the two rollers extend parallel to each other, but since the two rollers taper toward their forward or lower ends, as shown in Figure 1, the space between the rollers gradually decreases in width towards the upper or rear ends of the rollers. It will thus be seen that corn stalks may move easily between the rollers and, as the stalks advance toward the rear or upper ends of the rollers, they will be gradually moved into position in which the rollers may engage the stalks from opposite sides thereof.

The feeding roller I is formed with a plurality of spirally extending ribs 7 which are spaced from each other circumferentially of the roller and extend spirally about the same between the lower or forward end of the roller and a point in spaced relation to the collar 5 of this roller. From this point, which is indicated by the numeral 8, each of the ribs 7 has a section 7' extending spirally of the roller but in a reversed direction and terminating at the collar.

The ribs 7 and their extensions 7' may be formed of metal rods which are welded or otherwise firmly anchored to the roller I or the ribs may be formed integral with the roller, as shown in Figure 3.

When the ribs are formed of rod, as shown in Figure 2, they may be circular in cross section and when they are formed integral with the roller, as shown in Figure 3, they may be substantially V-shaped or half round. By so forming the ribs 7 they will serve to advance corn stalks between the rollers for a major portion of the length of the space between the same and the end portions 7' will cooperate with the reversely spiraled end portions 9' of the ribs 9 carried by the roller 2 to repel movement of the corn stalks rearwardly between the rollers and thus tend to prevent the corn stalks from becoming jammed between the rear ends of the rollers and in addition materially assist in the snapping and husking of ears of corn from the corn stalks. The ribs 9 of the snapping roller 2 may be formed integral with the roller or may be formed of a metal rod welded thereto, and upon referring to Figures 1 and 2, it will be seen that the snapping roller is provided with a pair of ribs instead of a larger number carried by the feeding roller 1. Those ribs 9 extend spirally of the roller 2, but together with their extensions 9' only make one spirally extending path about the roller instead of extending about the roller a number of times along a spiral path between the front and rear ends of the roller.

The ribs of the snapping rollers together with the ribs of the feeding roller will serve very effectively to move the husk and the stalk from the ear of corn. If the ears of corn are not removed before reaching the reversely spiraled portions of the ribs, these portions of the ribs will assure removal of the ear from the husk and stalk as well as serving to urge the corn stalks forwardly away from the collars 5 and preventing wedging of the corn stalks between rear ends of the rollers. It will thus be seen that the rollers cannot become jammed due to corn stalks wedging between their rear ends.

Instead of extending the ribs of the snapping roller 2 in a spirally extending path, this roller may be provided with ribs spaced from each other circumferentially of the roller and extending parallel to the axis thereof for the full length of the roller between its front end and the collar 5, as shown in Figures 4 and 5.

In this embodiment of the invention, threaded sockets 11 are formed in the roller in spaced relation to each other between the ribs. These sockets are provided to receive screws 12, by means of which strips 13 are secured to the roller. These strips are formed of corded rubber or plain rubber so that they will be of a yielding nature and while they may be formed of any desired material, they may be strips cut from the tread of a worn automobile tire. These yieldable strips take the place of the reversely spiraled end portions of the ribs and cooperate with the reversely spiraled ribs of the feeding roller to prevent wedging of corn stalks between the rear end portions of the rollers.

Having thus described the invention, what is claimed as new is:

Corn harvester mechanism comprising a pair of rollers rotatably mounted and spaced transversely from each other, spiral ribs formed on one of said rollers and making a plurality of turns about the same and having their rear portions spiraled about said roller in a direction opposite to the remainder of the ribs, said rear portions being relatively short as compared to the length of said roller, oppositely disposed longitudinal ribs formed on the other roller extending spirally about said roller and making a turn of substantially 180° in one direction for the major portion of the length of the roller in a direction opposite to the ribs on the forward portion of the other roller with their rear ends extending spirally around said roller in a direction opposite the reversely spiraled portions of the ribs on the companion roller, and means for transmitting motion from one roller to the other.

RUDOLPH H. BLANK.